United States Patent
Macken et al.

(10) Patent No.: US 10,354,684 B1
(45) Date of Patent: Jul. 16, 2019

(54) TRANSDUCING HEAD WITH A SURFACE CHARGED READER

(71) Applicant: Seagate Technology LLC, Cupertino, CA (US)

(72) Inventors: Declan Macken, Eden Prairie, MN (US); Daniel W. Olson, Minneapolis, MN (US)

(73) Assignee: Seagate Technologies LLC, Cupertino, CA (US)

( * ) Notice: Subject to any disclaimer, the term of this patent is extended or adjusted under 35 U.S.C. 154(b) by 0 days.

(21) Appl. No.: 15/973,673

(22) Filed: May 8, 2018

Related U.S. Application Data

(60) Provisional application No. 62/502,986, filed on May 8, 2017.

(51) Int. Cl.
*G11B 5/127* (2006.01)
*G11B 5/60* (2006.01)
*G11B 5/09* (2006.01)

(52) U.S. Cl.
CPC ............... *G11B 5/607* (2013.01); *G11B 5/09* (2013.01); *G11B 5/6082* (2013.01)

(58) Field of Classification Search
CPC ....... G11B 5/40; G11B 5/00813; G11B 5/187; G11B 5/255; G11B 21/02; G11B 5/455; G11B 5/6035; G11B 5/607; G11B 5/127

USPC .................................................. 360/75, 328
See application file for complete search history.

(56) References Cited

U.S. PATENT DOCUMENTS

| | | | |
|---|---|---|---|
| 6,515,957 B1 | 2/2003 | Newns et al. | |
| 6,888,693 B2 * | 5/2005 | Boutaghou | G11B 5/581 |
| | | | 29/603.07 |
| 7,046,473 B2 | 5/2006 | Fu et al. | |
| 7,440,219 B2 | 10/2008 | Zhu et al. | |
| 7,821,808 B2 | 10/2010 | Zhao et al. | |
| 8,085,490 B2 | 12/2011 | Franca-Neto et al. | |
| 8,169,751 B2 | 5/2012 | Albrecht et al. | |
| 8,830,618 B2 | 9/2014 | Li et al. | |
| 8,995,076 B1 | 3/2015 | Olson et al. | |
| 9,502,064 B1 | 11/2016 | Macken et al. | |
| 9,691,419 B1 | 6/2017 | Olson et al. | |
| 9,837,107 B2 * | 12/2017 | Biskeborn | G11B 5/00821 |
| 9,842,618 B1 | 12/2017 | Hutchinson et al. | |

* cited by examiner

*Primary Examiner* — Nabil Z Hindi
(74) *Attorney, Agent, or Firm* — Hall Estill Attorneys at Law

(57) ABSTRACT

A data storage device can employ one or more transducing heads that have a data reader and data writer each connected to a substrate of the transducing head. The substrate can be electrified with a predetermined surface charge by a charge circuit of the transducing head to maintain, or alter, a head-media spacing.

20 Claims, 3 Drawing Sheets

TRANSDUCING HEAD WITH A SURFACE CHARGED READER

RELATED APPLICATION

This application makes a claim of domestic priority to U.S. Provisional Patent Application No. 62/502,986 filed May 8, 2017, the contents of which are hereby incorporated by reference.

SUMMARY

A transducing head of a data storage device, in accordance with some embodiments, has a data reader and data writer each connected to a substrate of the transducing head. The substrate is electrified with a predetermined surface charge by a charge circuit of the transducing head to maintain, or alter, a head-media spacing.

In other embodiments, a transducing head of a data storage device consists of a data reader, data writer, and sensing circuit each connected to a substrate in a transducing head with the substrate electrified with a predetermined surface charge by a charge circuit of the transducing head to maintain, or alter, a head-media spacing.

A data storage device can be operated, in accordance with various embodiments, by connecting a data reader, data writer, and sensing circuit to a substrate in a transducing head prior to electrifying the substrate with a predetermined surface charge by a charge circuit of the transducing head to maintain, or alter, a head-media spacing.

DETAILED DESCRIPTION

Advancements in data storage devices has provided greater data storage performance by flying a transducing head close to a data storage medium. Control of the position of the transducing head relative to the data storage medium, as well as detection of head-medium contact, has been paramount to maintaining data storage performance over time as wear and contamination can degrade the transducing head and/or medium. While a surface charge can be applied to a writer portion of a transducing head to provide high fidelity head-medium contact detection, surface charge has not been applied to a data reader portion of the transducing head.

The lack of surface charge proximal a data reader diminishes the accuracy of actual and predicted wear and performance variations. However, applying a surface charge to a data reader involves more than simply connecting the reader to a charging circuit due to the effects of charge on a data reader, such as a magnetoresistive stack. Hence, assorted embodiments are directed to a data storage device with a head circuit that applies a surface charge proximal a data reader while maintaining accurate data sensing with a high signal-to-noise ratio.

Figure 1:
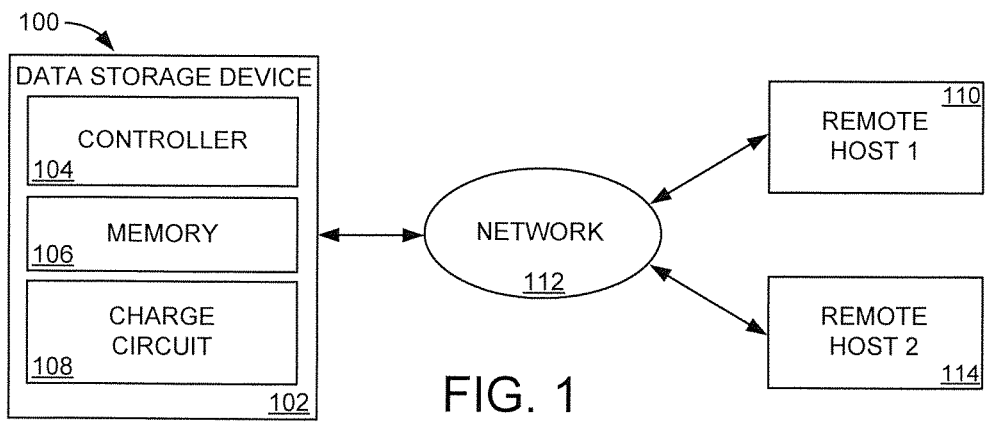
FIG. 1 is a line representation of an example portion of a data storage system configured and operated in accordance with some embodiments.

FIG. 1 depicts a block representation of an example data storage system 100 where various embodiments can be employed and practiced. The system 100 can have any number of data storage devices 102 operating individually, and collectively, to provide data generation, processing, manipulation, transmission, and storage. The computing device 102 may be any type and size, such as a desktop computer, laptop, tablet computer, smartphone, or peripheral device.

It is contemplated that each storage device 102 of the system 100 has a local controller 104, such as a microprocessor or programmable processor, that directs data to and from at least one local memory 106. A local memory 106, in some embodiments, consists of a rotating magnetic medium, such as a hard disc drive or hybrid data storage drive, where a transducing head interacts with the rotating magnetic medium to program and read data. A charge circuit 108 of the data storage device 102 can provide sufficient voltage to the transducing head to detect head-medium contact as well as head war and contamination.

Although one or more local data storage devices 102 can operate in isolation, such as in the same physical building, location, city, or room, various embodiments connect at least one local data storage device 102 with a remote host 110 via a wired and/or wireless network 112. As shown, the network can connect a computing device 102 to more than one host 110/114, which can operate individually or concurrently to provide a processing, memory, and data pathway. As a non-limiting example, a first remote host 110 can be computing device while a second remote host 114 is a network node, server, or switch.

Figure 2:
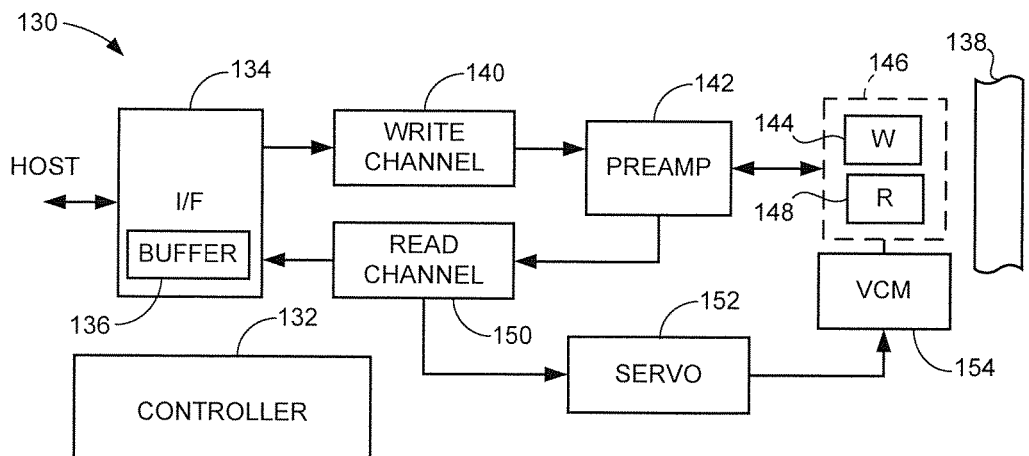
FIG. 2 displays a block representation of an example data storage device capable of being utilized in the data storage system of FIG. 1.

FIG. 2 displays a functional block diagram for a portion of an example data storage device 130 that may correspond to the device 102 of FIG. 1. The data storage device 130 is characterized for purposes of the present disclosure as a hard disc drive (HDD) that employs magnetic recording to store data from a host device, such as the local controller 104 or remote host 110/114 of FIG. 1. The data storage device 130 has a top level local controller 132 that may be realized in hardware or firmware.

An interface circuit (I/F) 134 communicates with the host device and has a data buffer 136 to temporarily store data pending transfer between the host device and a rotatable perpendicular data recording medium 138. A write channel 140 operates to encode input write data from the host to provide a serialized data stream to a preamplifier/driver (preamp) 142. The preamp 142 provides a sequence of write currents to a perpendicular magnetic write element (W) 144 of a data transducer 146 to write data to the medium 138.

During a readback operation, readback signals are transduced by a magnetoresistive (MR) read element (R) 148 of the data transducer 146. The transduced signals are supplied to the preamp 142. The preamp 142 conditions and amplifies the readback signals and provides the same to a read channel 148. The read channel 148 applies signal processing techniques to recover the originally stored data to the buffer 136 pending subsequent transfer to the host.

During both read and write operations, specially configured servo positioning data provided to the medium 138 are transduced by the read element 148 and, after demodulation by a portion of the read channel 150, are supplied to a servo control circuit 152. The servo control circuit 152 provides positional control signals to a voice coil motor (VCM) 154 coupled to the data transducer 146 to position the respective write 144 and read 148 elements adjacent various data tracks defined on the medium 138.

Although not required or limiting, the preamp 142 may incorporate a charge control circuit that is directed by the controller 132 to manipulate and/or maintain the head media spacing between the data transducer 146 and the medium 138. That is, a charge control circuit may be physically located in the preamp 142 and utilize one or more connections of the preamp 142, such as a ground pad. It is contemplated that the charge control circuit may be on a common chip with some, or all, the preamp 142, but such configuration is not required.

Figure 3:
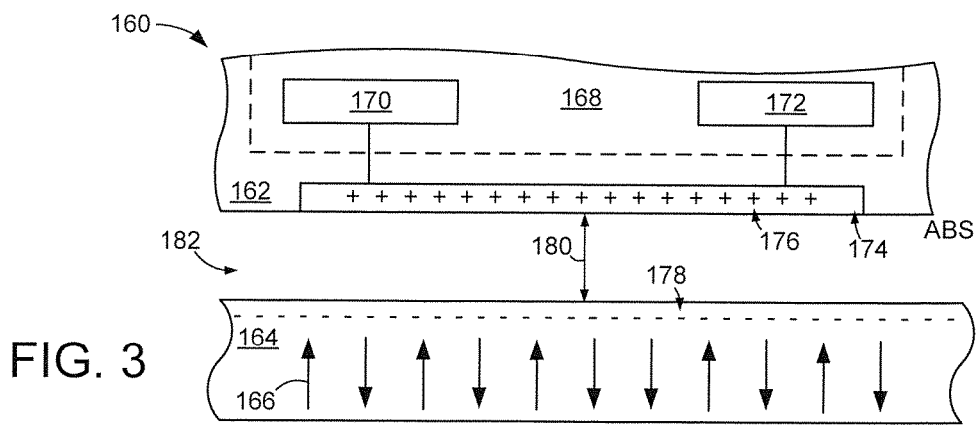
FIG. 3 conveys portions of an example data storage device in which assorted embodiments may be practiced.

FIG. 3 represents a portion of an example data storage device 160 configured in accordance with various embodiments to employ surface charge to manipulate the head media spacing. The data storage device 160 has a transducing head 162 proximal to and separated from a data storage medium 164. The transducing head 162 may have a data reader and data writer incorporated therein while the data storage medium 164 has a plurality of data bits 166 stored with a predetermined recording scheme, such as perpendicular, longitudinal, and bit-patterned data storage.

A surface charge control circuit 168 may be resident on, or interconnected to, the transducing head 162 with first 170 and second 172 voltage sources electrically connected to one or more substrates 174 positioned on, or proximal to, an air bearing surface (ABS). By configuring the voltage sources 170/172 to be different, non-zero values, a substrate charge 176 is produced on the ABS, as shown by plus signs. It is noted that the surface charge 176 is not restricted to a positive polarity charge and can oscillate charge at a specific frequency, as directed by a controller.

The charge resident in the substrate 174 can be altered in strength and polarity by adjusting the non-zero voltages of the respective voltage sources 170/172. A surface charge 178 in the data storage medium 164, which is shown as negative signs, but are limited to a negative polarity charge, can electrostatically interact with the substrate charge 176 to attract, or reduce attractive force from, the transducing head 172 to the data storage medium 164. The medium surface charge 178 may be static or dynamic, which can be compensated for by altering the substrate charge 176 via the respective voltage sources 170/172.

Through the manipulation of the substrate charge 176 relative to the medium charge 178, the head-media distance (spacing) 180 of the air bearing 184 between the head 162 and medium 164 can be increased, or decreased, quickly and accurately. In contrast, a piezoelectric actuator or heat controlled protrusion can be slow, power hungry, and too imprecise to accurately control the head media spacing 180 and optimize data storage and retrieval by the transducing head 162. For example, configuring the transducing head 162 for heat assisted magnetic recording (HAMR) can rely heavily on the head media spacing 180 for accurate operation as small differences in modeled and actual head media spacing 180 can result in too little, or too much heat being applied to the data storage medium.

It is contemplated that inclusion of a bleeder resistor between the substrate 174 and a ground in the control circuit 168 can degrade the strength of the substrate charge 176. Conversely, by electrically positioning the substrate 174 between the non-zero voltage sources 170/172, substrate charge 176 can be optimized and experience substantially loss-less transmission from the first voltage source 170, which may be a first driver and/or head circuit that serves as the first control module, to the second voltage source 172, which may be a second driver and/or head circuit that serves as the second control module.

Figure 4:
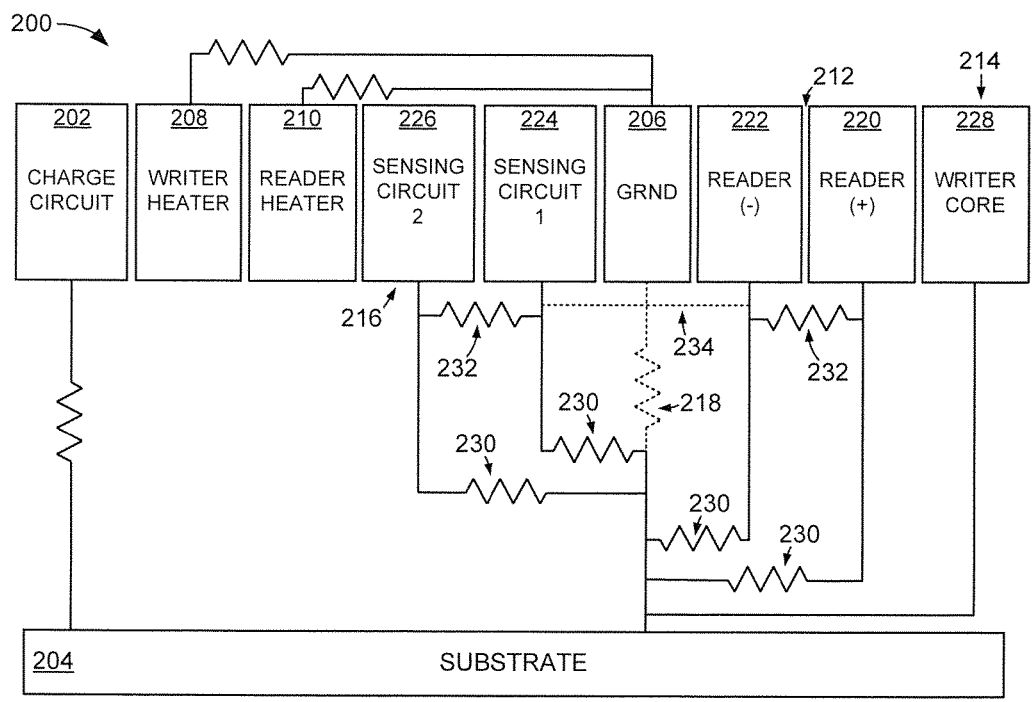
FIG. 4 illustrates a line representation of an example head circuit configured in accordance with various embodiments.

FIG. 4 illustrates a block representation of an example head circuit 200 constructed and operated in accordance with some embodiments to detect ABS wear and manipulate a separation distance between a transducing head and a data storage medium. The head circuit 200 has at least one charge circuit 202 that may consist of separate positive and negative voltage pathways each electrically connected to a substrate 204 that resides proximal the ABS of a transducing head. The substrate, in some embodiments, consists of AlTiC material, but such construction is not required.

A head ground pad 206 (GRND) is electrically connected to a data writer heater 208 and a data reader heater 210 respectively via heater resistors, which may be similar, or dissimilar, resistances, such as 49Ω or 60Ω. The head ground 206 may be isolated, in some embodiments, to connections with the respective heaters 208/210 while other embodiments connect head ground 206 to a data reader 212, data writer 214, and sensing circuit 216 via a bleeder resistor 218 that has a resistance, such as 40 kΩ, that allows residual charge to be dissipated when the substrate 204 is not actively charged.

The bleeder resistor 218 is segmented to convey that the connection is optional and is not required. When the bleeder resistor 218 is absent, the data reader 212, data writer 214, and sensing circuit 216 are each electrically connected to the substrate 204 without being electrically connected to the head ground 206. The lack of electrical connection between the reader 212, writer 214, and sensing circuit 216 to the head ground 206 allows for more efficient use of applied voltage. Regardless of the inclusion of the bleeder resistor 218, the electrical connection of the data reader 212 and data writer 214 to the charged substrate 204 allows for both entities to be charged, which allows a local, or remote, controller to more accurately estimate ABS wear, affect air bearing size changes, and detect head-medium contact.

It is noted that the position of the bleeder resistor 218 is selected to be between the head ground 206 and the connections of the reader 212, writer 214, and sensing circuit 216. That is, electrical signals can pass from the respective reader 212, writer 214, and sensing circuit 216 to the substrate 204 without passing through the bleeder resistor 218 due to the deliberate electrical link from the substrate 206. Conversely, positioning the bleeder resistor 218 between the reader 212, writer 214, or sensing circuit 216 would electrically isolate the respective entities from the substrate 206.

Although not required or limiting, the data reader 212 consists of positive 220 and negative 222 pathways, as shown, while the sensing circuit 216 has multiple pathways from the respective circuitry 224/226 and the data writer 214 consists of at least a writer core 228. The sensing circuit 216 may incorporate any number and types of sensors, such as an acoustic, optical, or temperature sensor. In the example of FIG. 4, the sensing circuit 216 is a dual ended temperature coefficient of resistance (DETCR) sensor.

It is noted that the constituent pathways of the respective data reader 212 and sensing circuit 216 each have an inline resistor 230 as well as a bridge resistor 232. The assorted resistors 230/232 can have common, or dissimilar, resistances that are tuned to optimize data recording and reading performance. It is further noted that the parallel electrical connection of the data writer 214, data reader 212, and sensing circuitry 216 is not required, but can efficiently electrify the substrate 204 compared to connecting the respective components to the substrate 204 in series. It is contemplated, but not required, that the one, or both, of the reader circuits 220/222 and the sensing circuits 224/226 can be charged directly via a common mode on the same side of the bleeder resistor 218 as the reader 212 or grounded via a ground pathway 234.

Figure 5:
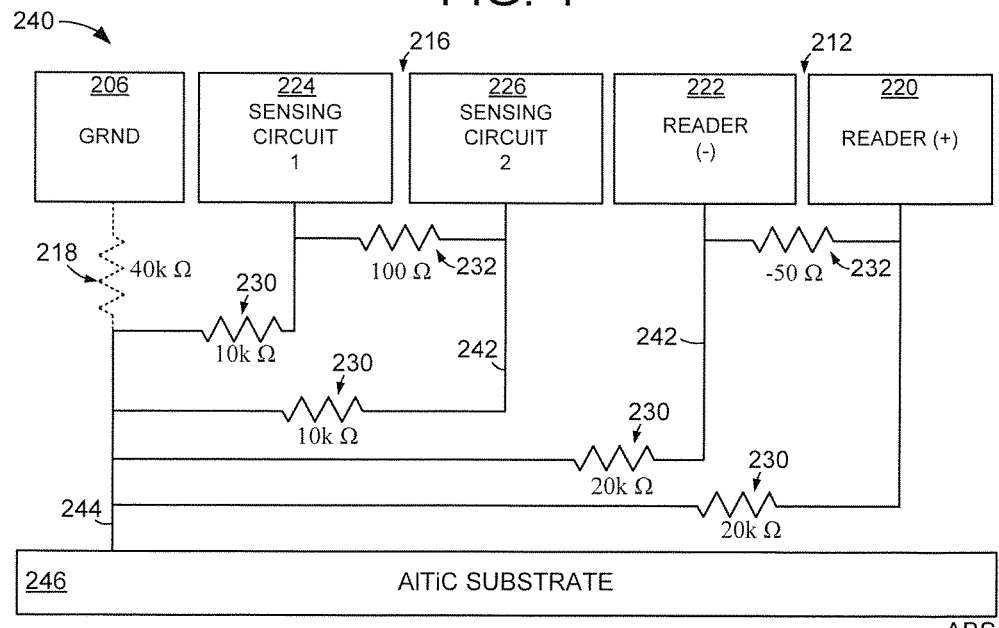
FIG. 5 shows a line representation of portions of an example head circuit constructed and operated in accordance with some embodiments.

FIG. 5 represents a portion of an example head circuit 240 that may be employed as part of the circuit 200 of FIG. 4 and the system 100 of FIG. 1 in some embodiments. The head circuit 240 is configured in a manner similar to that shown in FIG. 4, but with non-limiting resistance values that convey how the head circuit 240 can be tuned to provide ABS surface charge proximal the data reader 212. It is noted that the in-line resistors 230 of the respective sensing circuits 224/226 and the reader circuits 220/222 are similar values that are dissimilar from the respective bridge resistors 232.

In the embodiment where the bleeder resistor 218 is not installed, the head ground 206 is electrically isolated from both the sensing circuit 216 and the data reader 212. The connection of the respective circuit leads 242 to a common trunk lead 244 prior to attaching to the substrate 246 is not required, but can provide for efficient use of space on a printed circuit board. The substrate 246 in FIG. 5 is constructed of AlTiC that can be replaced, in various embodiments, by other alloys, such as AlTiB.

Figure 6:
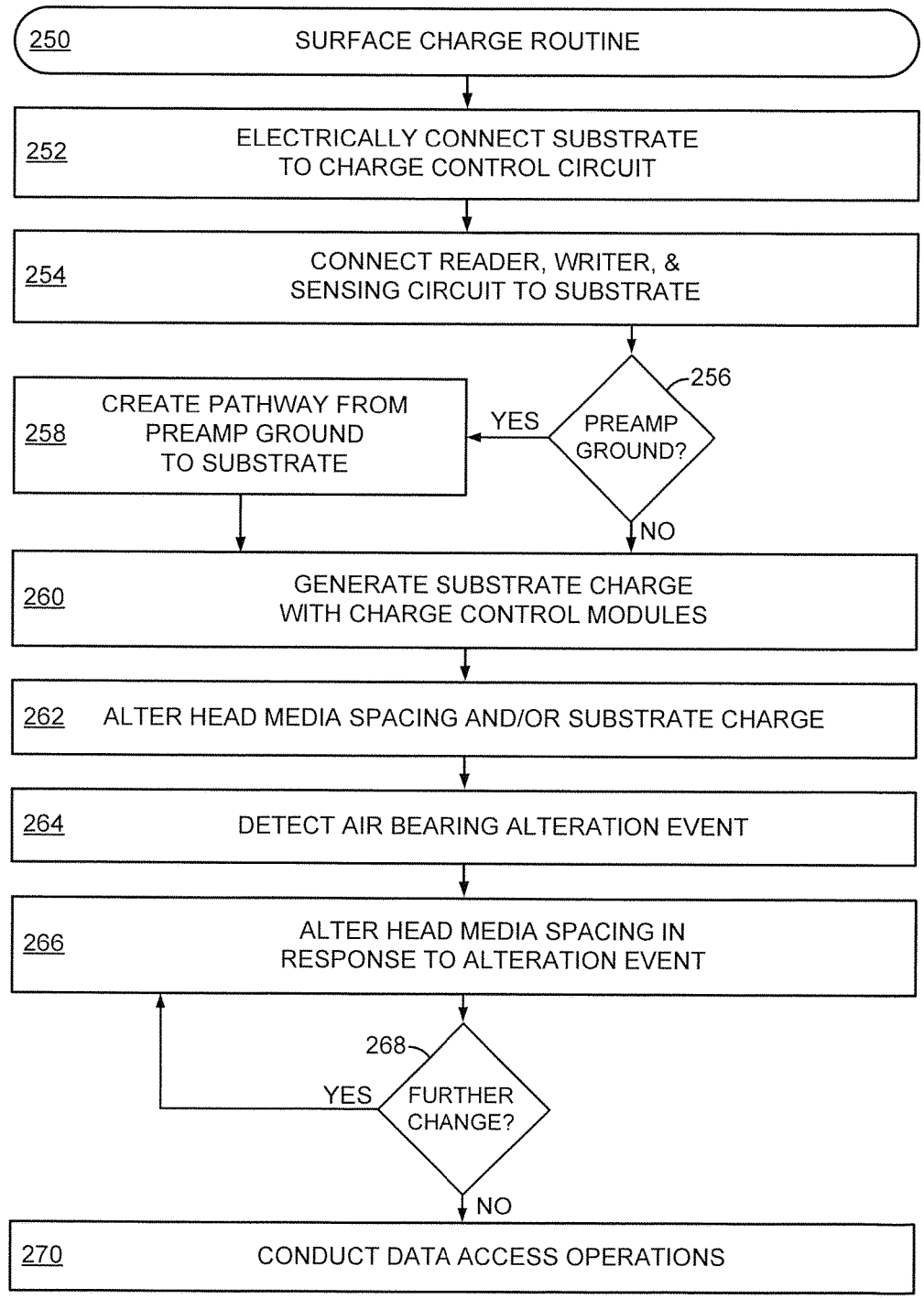
FIG. 6 provides an example surface charge routine that is carried out in accordance with assorted embodiments by the data storage system of FIG. 1.

FIG. 6 is a flowchart of an example surface charge routine 250 that is carried out in some embodiments by the data storage system 100 of FIG. 1 and head circuit 200 of FIG. 4. The routine 250 may begin by electrically connecting a data reader, data writer, and sensing circuit of a transducing head to a charged substrate. It is understood that the substrate may previously be connected to a charge circuit, such as shown in step 252, and the electrical connections of the transducing head can be fabricated concurrently, sequentially, or randomly.

In the non-limiting example of routine 250, step 254 establishes at least one electrical connection to the charged substrate with the data reader and sensing circuit. Decision 256 then evaluates if the substrate, and connected reader and sensing circuit, are to be connected to the head ground via a bleeder resistor. If so, step 258 creates an electrical pathway with a predetermined resistance, which may be similar to the segmented portions of head circuits 200 and 240. If not, or at the conclusion of step 258, step 260 proceeds to employ multiple non-zero voltages provided by the control modules to produce a static or oscillating charge in the substrate of the transducing head in step 260.

The substrate charge can be generated at a predetermined frequency in step 260 that may vary with respect to time and/or the rotation of the adjacent data storage medium. For instance, the surface charge control circuit can detect a data medium rotational speed (RPM) by sensing the servo sampling frequency from the data storage medium and subsequently set the substrate charge to the detected servo sampling frequency. The ability to adjust the substrate charge frequency to the rotation of the corresponding data storage medium allows the charge generated in step 260 to be more compatible with the surface charge of the medium to alter the head media spacing in step 262. It is noted that step 262 may alter the substrate charge to reactively, or proactively, adapt to the surface charge of the data storage medium and maintain a head media spacing instead of changing the distance between the transducing head and medium.

With the substrate charge electrostatically interacting with the surface charge of the data storage medium, step 264 detects an air bearing alteration event, such as a thermal asperity, head-disk contact, or data writing operation, and proceeds to alter the substrate charge in step 266 to change the size of the air bearing. The head media spacing after step 266 can be evaluated in decision 268 to determine if further substrate charge changes are to be made by returning to step 266 or if data access operations can be conducted in step 270 due to the head media spacing being confirmed.

By charging the substrate proximal a data reader, estimation of transducing head wear and head-medium contact detection can be optimized. The attachment of the data reader, data writer, and sensing circuit of a head circuit downstream of a head ground bleeder resistor, in one embodiment, allows for the data reader to be a charged entity. In another embodiment, the head ground can be electrically isolated from the substrate to more efficiently use applied voltage from the head circuit. The ability to tune the electrical pathway configuration and pathway resistances allows a head circuit to provide surface charge tuned to the particular data storage environment in which the transducing head housing the head circuit, reader, writer, and sensing circuit is utilized.

It is noted that the various embodiments are not limited to a data storage devices as the technology can readily be utilized in any number of other applications, such as switches and other electrical closure applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a data reader and data writer each connected to a substrate in a transducing head, a heater circuit electrically connected to a ground pad of the transducing head, the substrate electrified with a predetermined surface charge by a charge circuit of the transducing head.

2. The apparatus of claim 1, wherein the substrate comprises AlTiC material.

3. The apparatus of claim 1, wherein the substrate comprises AlTiB material.

4. The apparatus of claim 1, wherein the transducing head is separated from a data storage medium by an air bearing.

5. The apparatus of claim 4, wherein the substrate is positioned on an air bearing surface of the transducing head, facing the data storage medium.

6. The apparatus of claim 1, wherein the heater circuit is electrically connected to at least one heater resistor.

7. The apparatus of claim 1, wherein a writer core of the data writer is connected to the substrate with first and second circuits of the data reader via a parallel pathway.

8. The apparatus of claim 7, wherein the parallel pathway is connected to a ground pad of the transducing head via a bleeder resistor.

9. The apparatus of claim 7, wherein the parallel pathway is electrically isolated from a ground pad of the transducing head.

10. A system comprising a data reader, data writer, and sensing circuit each connected to a substrate in a transducing head, the substrate electrified with a predetermined surface charge by a charge circuit of the transducing head.

11. The system of claim 10, wherein the sensing circuit is a dual ended temperature coefficient of resistance sensor.

12. The system of claim 10, wherein the data reader comprises a positive circuit and a negative circuit each connected to the substrate via a lead having an inline resistor.

13. The system of claim 12, wherein a bridge resistor connects the respective leads of the positive and negative circuits of the data reader, the inline resistors and the bridge resistor being different resistances.

14. The system of claim 13, wherein the bridge resistor has a −50 ohm resistance.

15. The system of claim 10, wherein the sensing circuit comprises first and second sub-circuits each connected to the substrate via a lead having an inline resistor.

16. The system of claim 15, wherein a bridge resistor connects the respective leads of the sub-circuits of the sensing circuit, the inline resistors and the bridge resistor being different resistances.

17. The system of claim 10, wherein the sensing circuit is electrically isolated from a ground pad of the transducing head.

18. The system of claim 10, wherein the substrate is physically proximal to the data reader.

19. A method comprising:
   connecting a data reader, data writer, and sensing circuit to a substrate in a transducing head; and
   electrifying the substrate with a predetermined surface charge by a charge circuit of the transducing head to maintain a head-media spacing.

20. The method of claim 19, wherein the charge circuit alters the predetermined surface charge in response to a detected alteration event to maintain the head-media spacing.

* * * * *